(12) United States Patent
Mekkattuparamban et al.

(10) Patent No.: US 9,807,020 B2
(45) Date of Patent: Oct. 31, 2017

(54) POLICY ENFORCEMENT FOR UPSTREAM FLOOD TRAFFIC

(71) Applicant: Cisco Technology, Inc., San Jose, CA (US)

(72) Inventors: Joji Thomas Mekkattuparamban, Sunnyale, CA (US); Vijay Chander, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 172 days.

(21) Appl. No.: 14/793,301

(22) Filed: Jul. 7, 2015

(65) Prior Publication Data

US 2016/0330125 A1    Nov. 10, 2016

Related U.S. Application Data

(60) Provisional application No. 62/159,100, filed on May 8, 2015.

(51) Int. Cl.

| | |
|---|---|
| G06F 15/173 | (2006.01) |
| H04L 12/813 | (2013.01) |
| H04L 12/721 | (2013.01) |
| H04L 12/18 | (2006.01) |
| H04L 12/931 | (2013.01) |
| H04L 12/46 | (2006.01) |
| H04L 12/24 | (2006.01) |
| H04L 12/775 | (2013.01) |

(52) U.S. Cl.
CPC ............ *H04L 47/20* (2013.01); *H04L 12/185* (2013.01); *H04L 12/4633* (2013.01); *H04L 41/00* (2013.01); *H04L 45/32* (2013.01); *H04L 45/58* (2013.01); *H04L 49/70* (2013.01)

(58) Field of Classification Search
CPC ... H04L 47/20; H04L 12/185; H04L 12/4633; H04L 41/00; H04L 45/32; H04L 45/58; H04L 49/70
USPC ........................................................ 709/223
See application file for complete search history.

(56) References Cited

U.S. PATENT DOCUMENTS

| | | | | |
|---|---|---|---|---|
| 6,167,051 A | * | 12/2000 | Nagami | H04L 12/1886 370/395.2 |
| 9,548,872 B2 | * | 1/2017 | Ghanwani | H04L 43/0894 |
| 2013/0163419 A1 | * | 6/2013 | Armstrong | H04L 12/4641 370/230 |
| 2013/0205296 A1 | * | 8/2013 | Cardona | G06F 9/542 718/1 |
| 2014/0192804 A1 | * | 7/2014 | Ghanwani | H04L 49/70 370/390 |

(Continued)

*Primary Examiner* — S M Rahman
(74) *Attorney, Agent, or Firm* — Polsinelli PC

(57) ABSTRACT

Systems, methods, and computer-readable media are provided for enforcing policy for upstream (e.g., traffic from an endpoint to the physical network layer or hardware fabric of a data center) flood traffic (e.g., broadcast, unknown unicast, or multicast traffic) originating from a virtual endpoint via a network fabric. In one embodiment, upstream flood traffic can be transmitted using a special multicast group to which only elements of the data center fabric (e.g., physical switches, routers) are subscribed. That is, upstream flood traffic is assigned to the special multicast group, resulting in unintended endpoints not receiving the flood traffic. However, the hardware fabric receives the flood traffic and will then enforce applicable policies to route the packets to intended endpoints.

20 Claims, 7 Drawing Sheets

(56) References Cited

U.S. PATENT DOCUMENTS

2014/0258397 A1\* 9/2014 Heerboth ................ H04L 12/12
                                                                                         709/204

\* cited by examiner

POLICY ENFORCEMENT FOR UPSTREAM FLOOD TRAFFIC

CROSS-REFERENCE TO RELATED APPLICATION

This application claims priority to U.S. Provisional Application No. 62/159,100, filed May 8, 2015, the disclosure of which is incorporated herein by reference in its entirety.

TECHNICAL FIELD

The present technology relates in general to the field of computer networks, and more specifically to policy enforcement via a physical network layer or hardware fabric of a data center.

BACKGROUND

As more and more enterprises are transitioning to next-generation data centers and integrating cloud computing for their business requirements, automated and robust policy management is becoming necessary to support on-demand provisioning of computing resources and dynamic scaling of applications. Conventionally, network administrators manually configure security policies in the data center using a device-centric management model. However, such an approach is likely to result in security breaches caused by policy misconfiguration. In addition to lack of automation, a primary reason for misconfiguration is lack of awareness regarding application context. For example, organizations may have tens of thousands to millions of access control lists (ACLs) and firewall rules. These organizations often lack the operational processes to remove these policies in a timely way when applications are decommissioned and/or prefer to retain policies because they are uncertain about the potential effect of removal.

A conventional approach for policy management utilizes manual service chaining and a static network topology that is bound to network connections, VLAN, network interface, IP addressing, etc. This model requires policy configuration across multiple security devices (e.g., firewalls and intrusion detection and prevention systems (IDSs and IPSs)), slows application deployment, and is hard to scale because applications are frequently created, moved, and decommissioned in a next-generation data center. Another conventional approach for policy management is to implement a virtualization-centric model, but this approach fails to address applications not running as virtual machines. Further, the hypervisor-based overlay approach requires that each connection pass through multiple policy enforcement points (e.g., source virtual machine, destination virtual machine, and firewall). This routing introduces overhead and complexity for each inter-application connection.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
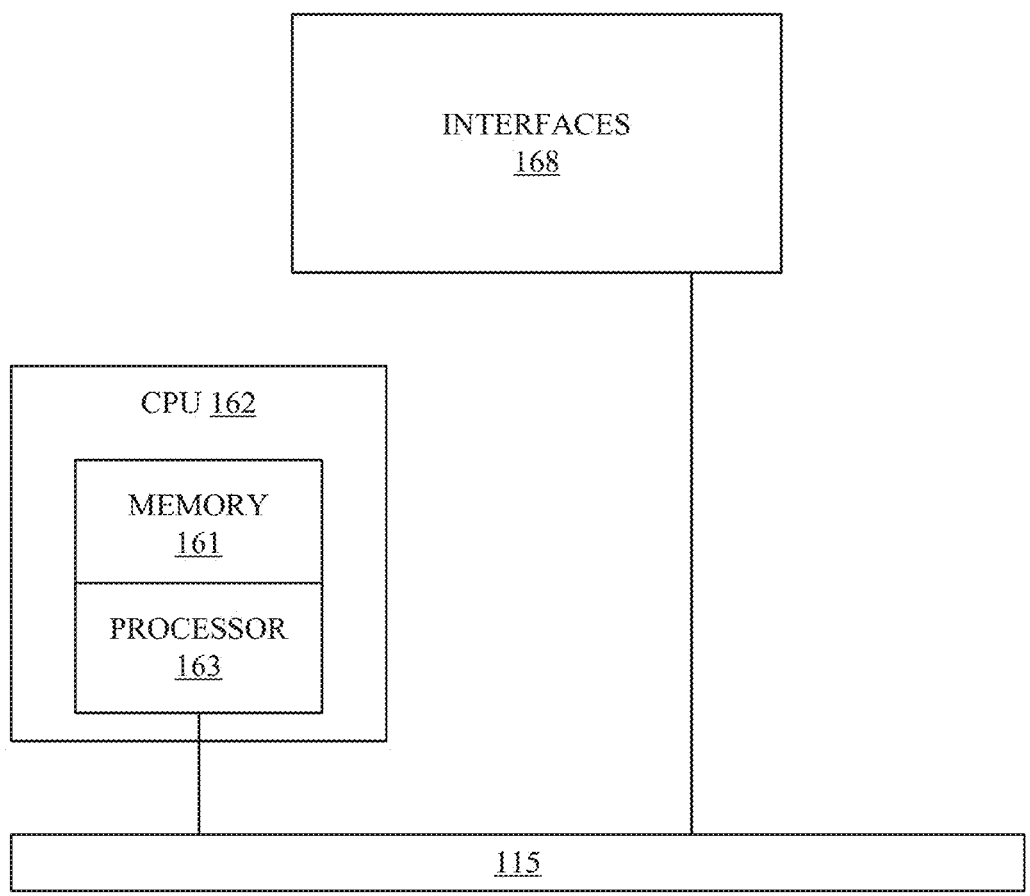
FIG. 1 illustrates an example network device according to some aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Systems and methods in accordance with various embodiments of the present disclosure may overcome one or more of the aforementioned and other deficiencies experienced in conventional approaches for policy management. In various embodiments, an application-centric, unified, and automated approach can be implemented for policy management in the data center and cloud infrastructure that is decoupled from the underlying network topology, supports application mobility, offers real-time compliance lifecycle management, and reduces the risk of security breaches. This approach is based on promise theory. Promise theory is based on declarative, scalable control of intelligent objects, in comparison to conventional imperative models, which can be thought of as heavyweight, top-down management. An imperative model is a big brain system or top-down style of management. In these systems the central manager must be aware of both the configuration commands of underlying objects and the current state of those objects. Promise theory, in contrast, relies on the underlying objects to handle configuration state changes initiated by the control system as desired state changes. The objects are in turn also responsible for passing exceptions or faults back to the control system. This lightens the burden and complexity of the control system and allows for greater scale. These systems scale further by allowing for methods of underlying objects to in turn request state changes from one another and/or lower level objects. With this approach, there is a new level of abstraction between the hardware and the software and a methodology to adapt networking across various hardware platforms, capabilities, and future evolutions. This can allow automation between networking and application teams, and substantially reduce the time of deployment for applications.

In some embodiments, the physical network layer or hardware fabric of a data center is built on a two-tier, spine-leaf design that uses a bipartite graph where each leaf is a switch that connects to each spine switch (though a full mesh is not required in certain embodiments), and no direct connections are allowed between leaf switches and between spine switches (sometimes referred to as a two-tier Clos network). The leaves act as the connection point for all external devices and networks, and the spines act as the high-speed forwarding engine between leaves. The fabric is managed, monitored, and administered by a controller appliance (or cluster of controllers).

In some embodiments, a policy management model can be built on a series of one or more tenants that allow segregation of the network infrastructure administration and data flows. Tenants can be broken down into private Layer 3 networks or "contexts," which directly relate to a Virtual Route Forwarding (VRF) instance or separate IP space. Each tenant may have one or more private Layer 3 networks or contexts depending on their business needs. Private Layer 3 networks provide a way to further separate the organizational and forwarding requirements below a given tenant. Because contexts use separate forwarding instances, IP addressing can be duplicated in separate contexts for the purpose of multi-tenancy.

Below the context, the policy management model incorporates a series of objects that define the application itself. These objects are called endpoint groups (EPGs). EPGs are a collection of similar endpoints representing an application tier or set of services. EPGs are connected to each other via policies. As used herein, policies are more than just a set of ACLs and can include a collection of inbound/outbound filters, traffic quality settings, marking rules/redirection rules, and Layers 4-7 service device graphs.

EPGs provide a logical grouping for objects that require similar policy. For example, an EPG could be the group of components that make up an application's web tier. Endpoints themselves are defined using NIC, vNIC, IP address, or DNS name with extensibility for future methods of identifying application components. EPGs can also be used to represent other entities such as outside networks, network services, security devices, network storage, etc. They are collections of one or more endpoints providing a similar function. They are a logical grouping with varying use options depending on the application deployment model in use.

The use of EPGs provides several benefits. EPGs can act as a single policy enforcement point for a group of contained objects. This can simplify configuration of policies and ensure their consistency. Additional policy can be applied based on EPG rather than subnet as in conventional techniques. This means that IP addressing changes to the endpoint do not necessarily change its policy, which is common in the case of conventional networks. Alternatively, moving an endpoint to another EPG applies the new policy to the leaf switch that the endpoint is connected to and defines new behavior for that endpoint based on the new EPG.

An additional benefit of EPGs relates to how policy is enforced for an EPG. The physical ternary content-addressable memory (TCAM) where policy is stored for enforcement is an expensive component of switch hardware and therefore tends to lower policy scale and/or raise hardware costs. In various embodiments, policy is applied via the hardware fabric based on the EPG rather than the endpoint itself. This policy size can be expressed as n×m×f, where n is the number of sources, m is the number of destinations, and f is the number of policy filters. Using this approach, sources and destinations become one entry for a given EPG, which reduces the number of total entries required. For example, if there are 5 sources, 4 destinations, and five policy filters, the conventional approach would require 100 policy entries. Using the various embodiments disclosed herein, only 5 policy entries are required because the number of sources and destinations are reduced down to 1.

As discussed, various advantages are provided by designing a data center such that policy is enforced via a physical network layer or hardware fabric of the data center. Further, it can be advantageous for a data center to accommodate flood traffic (e.g., broadcast, unknown unicast, or multicast traffic). For example, flooding techniques may use network infrastructure more efficiently by requiring a source endpoint to send a packet only once, and utilizing network elements (e.g., switches, routers) for replicating the packet to multiple receivers such that the packet is sent over each link of the network only once. It may also be advantageous for a data center to support virtual or overlay networking. However, upstream (i.e., traffic from an endpoint to the fabric) flood traffic from a particular endpoint can potentially be received by other virtual switches sitting on a same overlay network.

The subject technology provides embodiments for systems, methods, and non-transitory computer-readable storage media for enforcing policy for upstream flood traffic via a physical network layer or hardware fabric of a data center. This can be accomplished, in an embodiment, by transmitting upstream flood traffic using a special multicast group to which only nodes of the data center fabric (e.g., physical switches, routers) are subscribed. That is, upstream traffic is assigned to the special multicast group, resulting in unintended endpoints not receiving the flood traffic. When the hardware fabric receives the flood traffic, applicable policies can be enforced to route the packets to intended endpoints.

DETAILED DESCRIPTION

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Overlay networks can also include virtual segments, such as VXLAN segments in a VXLAN overlay network, which can include virtual L2 and/or L3 overlay networks over which virtual machines (VMs) communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments, networks, devices, ports, physical or logical links, and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPUs, memory, brute force processing capability), storage devices (e.g., network attached storages, storage area network devices), etc. In addition, such resources may be used to support virtual networks, virtual machines (VM), databases, applications ("apps"), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

The disclosed technology addresses the need in the art for improving policy enforcement. Disclosed are systems and methods for implementing and enforcing network policies of upstream flood traffic via a physical network layer or hardware fabric of a data center. A brief introductory description of exemplary systems and networks, as illustrated in FIGS. 1-4, is disclosed herein. A detailed description of policy enforcement for upstream flood traffic via the fabric, and example variations, will then follow. These variations shall be described as the various embodiments are set forth. The disclosure now turns to FIG. 1.

FIG. 1 illustrates an exemplary network device 110 suitable for implementing the present invention. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such policy enforcement, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the network device 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc., is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2A:
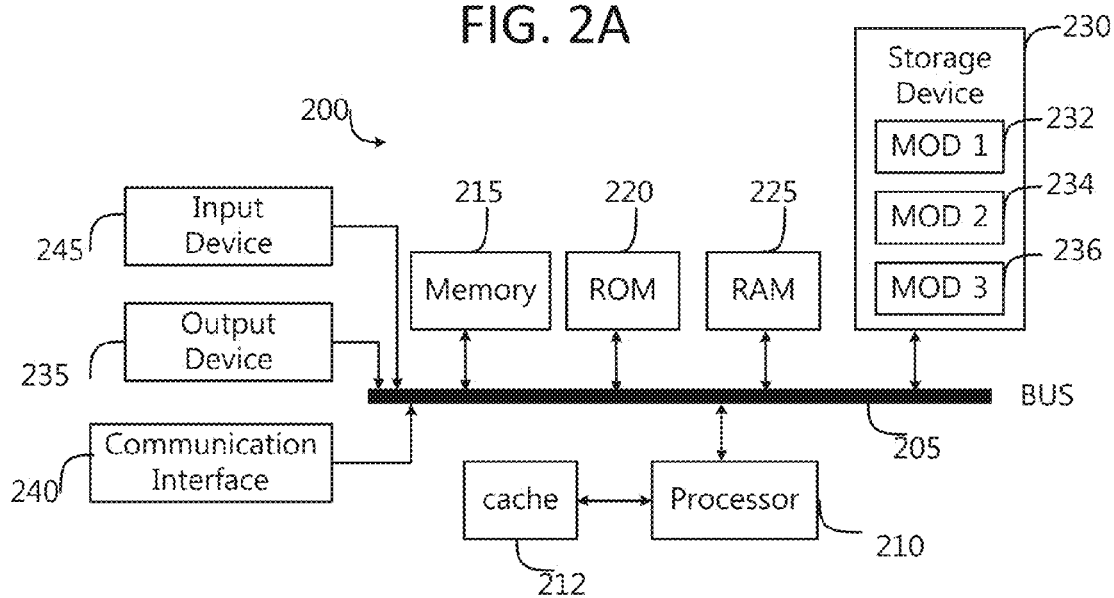
FIGS. 2A and 2B illustrate example system embodiments according to some aspects of the subject technology.
Figure 2B:
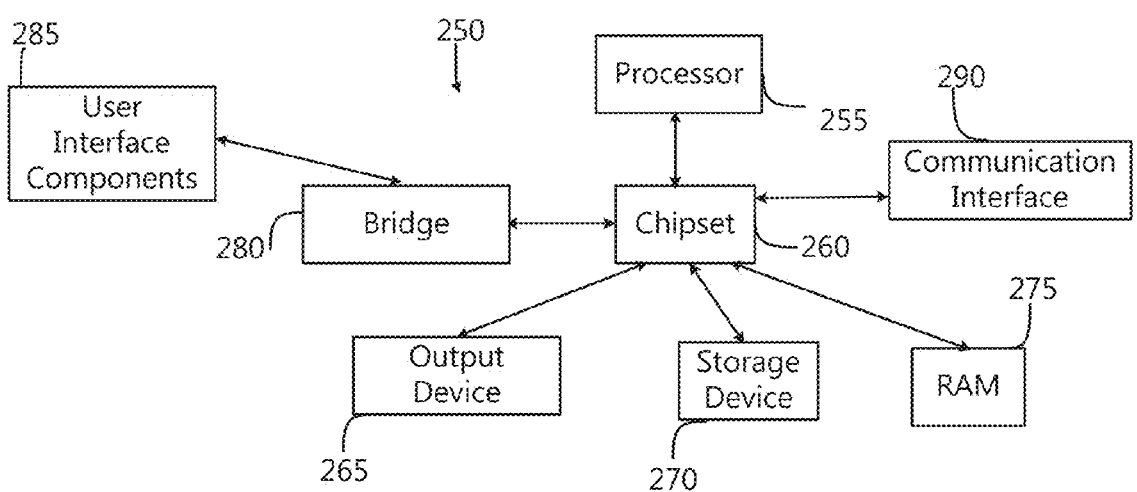

FIG. 2A and FIG. 2B illustrate systems that can be used in various embodiments. The more appropriate embodiment will be apparent to those of ordinary skill in the art when practicing the present technology. Persons of ordinary skill in the art will also readily appreciate that other embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech, etc. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
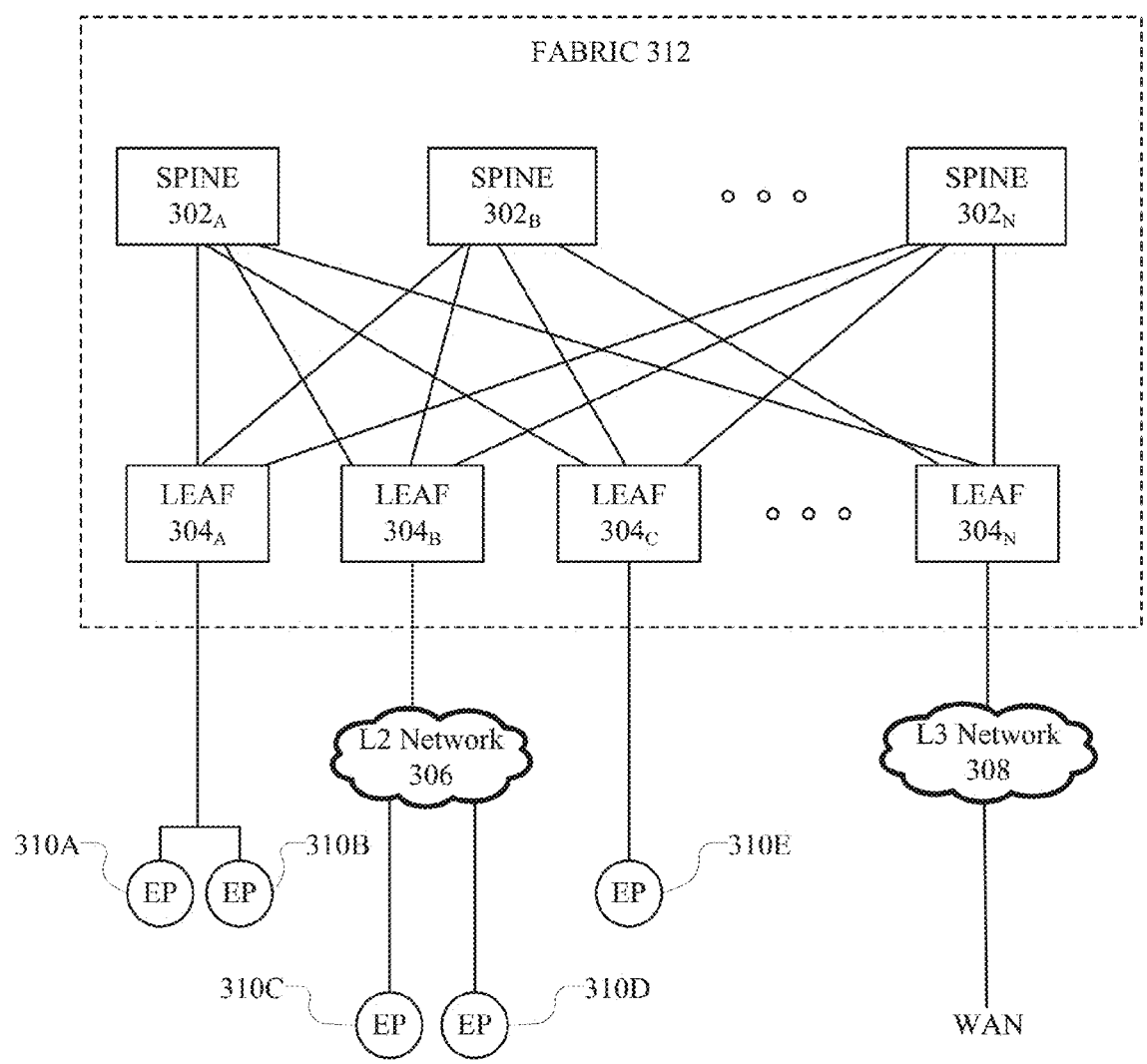
FIG. 3 illustrates a schematic block diagram of an example architecture for a network fabric according to some aspects of the subject technology.

FIG. 3 illustrates a schematic block diagram of an example architecture 300 for a network fabric 312 that can be used in various embodiments. The network fabric 312 can include spine switches $302_A$, $302_B$, ..., $302_N$ (collectively "302") connected to leaf switches $304_A$, $304_B$, $304_C$ ... $304_N$ (collectively "304") in the network fabric 312.

Spine switches 302 can be L3 switches in the fabric 312. However, in some cases, the spine switches 302 can also, or otherwise, perform L2 functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. The spine switches 302 can then perform a lookup of their local mapping database to determine the correct locator address of the packet and forward the packet to the locator address without changing certain fields in the header of the packet.

When a packet is received at a spine switch $302_i$, the spine switch $302_i$ can first check if the destination locator address is a proxy address. If so, the spine switch $302_i$ can perform the proxy function as previously mentioned. If not, the spine switch $302_i$ can look up the locator in its forwarding table and forward the packet accordingly.

Spine switches 302 connect to leaf switches 304 in the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

Leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

The leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, the endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
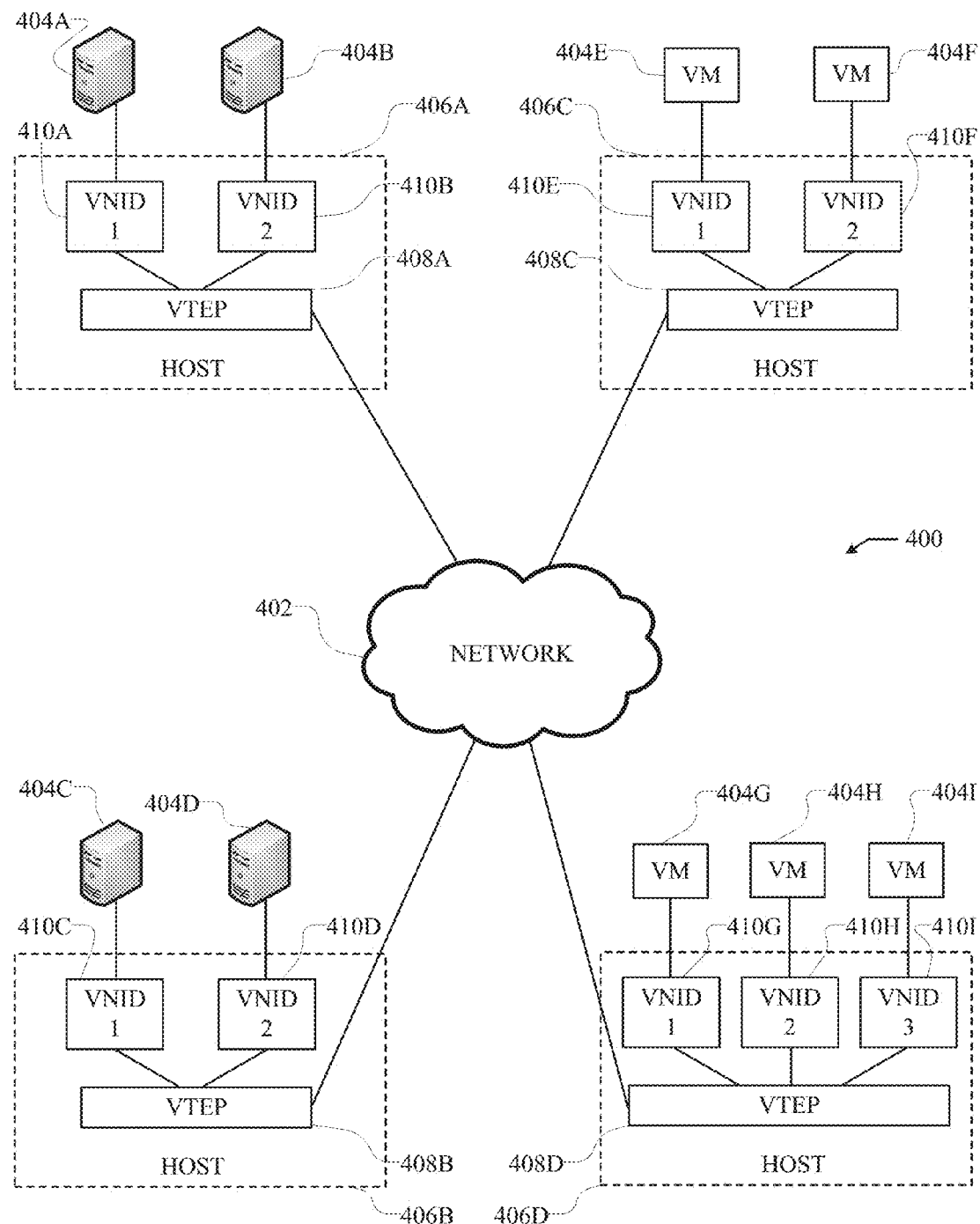
FIG. 4 illustrates an example overlay network according to some aspects of the subject technology.

FIG. 4 illustrates an exemplary overlay network 400. Overlay network 400 uses an overlay protocol, such as VXLAN, NVGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points (VTEP). However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 2, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNID2 and VNID3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, i.e., VNID 1. Similarly, server 404B can communicate with VMs 404F and 404H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a unicast packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, in some instances, VTEP 408A may analyze the routing table and fail to find any bindings or mappings associated with the intended recipient, e.g., endpoint 404H. Here, the routing table may not yet have learned routing information regarding endpoint 404H. In this situation, the packet is treated as an unknown unicast packet or a flood packet. In some conventional networks, flood traffic (e.g., broadcast, unknown unicast, or multicast traffic) transmitted over an overlay network is handled via IP multicasting. In IP multicasting, a unique IP address range is assigned as multicast group IP addresses. This range is a Class D address range from 224.0.0.0 to 239.255.255.255. Each address in this range represents a multicast group, although some addresses are reserved. A device in the network can join a multicast group using Internet Group Management Protocol (IGMP). After IGMP subscribe requests, when an IP packet with a destination IP address of a multicast group is transmitted, the packet gets forwarded to every device that has subscribed to the multicast group. The network devices (e.g., Layer 2 switches and Layer 3 routers) run multicast protocols to provide optimal delivery of packets to the intended endpoints.

Ideally, a network would be configured such that there is a one-to-one mapping of a logical network (e.g., VXLAN segment) to an IP multicast group address. It may be necessary, however, for some networks to have multiple virtual networks share a single multicast group address. For example, with a one-to-one mapping between VXLAN segments and IP multicast groups, an increase in the number of VXLAN segments concomitantly causes an increase in the required multicast address space and the amount of forwarding states on the physical network devices. At some point, multicast scalability in the transport network can become untenable. Therefore, mapping multiple VXLAN segments to a single multicast group can help conserve multicast control plane resources on the network devices and achieve the desired VXLAN scalability. This mapping, however, creates inefficiencies in multicast forwarding. For instance, packets forwarded to the multicast group for one tenant are now sent to the VTEPs of other tenants that are sharing the same multicast group address. This causes sub-optimal utilization of multicast data plane resources. Therefore, this conventional approach is a trade-off between control plane scalability and data plane efficiency.

Systems and approaches in accordance with various embodiments of the present disclosure overcome these limitations. As discussed, in various embodiments, a network can be configured to operate with a special multicast group to which only the physical network or hardware fabric is subscribed. In an embodiment, at least one IP address in the multicast address space can be reserved for the special multicast group. The network can be further configured such that no endpoints can join or subscribe to the special multicast group. When a flood packet is received to a virtual switch from a virtual endpoint, the switch will encapsulate the destination address of the packet with the IP address for the special multicast group, and forward the packet until it is ultimately received by the network fabric, e.g., a spine switch. At that point, the fabric may enforce applicable policies and can update the packet with the multicast group address designated to the virtual network of the endpoint from which the packet originated. The packet is then forwarded "downstream" (i.e., from the fabric to the designated multicast group) where it is eventually received only by intended endpoints.

As discussed, when multiple logical networks are mapped to a single multicast group address in the conventional manner, flood traffic for a particular logical network will be sent to that logical network as well as other logical network(s) sharing the same multicast group address. This can result in the flood traffic being received by unintended endpoints. Various embodiments avoid such deficiencies of the conventional approach by causing "upstream" traffic (i.e., traffic flowing from an endpoint to the fabric) to be routed to the fabric before being routed to a designated multicast group address. This ensures that policy is enforced by the fabric, and that only the intended endpoints receive the traffic.

As one of ordinary skill in the art will readily recognize, the examples and technologies provided above are simply for clarity and explanation purposes, and can include many additional concepts and variations.

Figure 5:
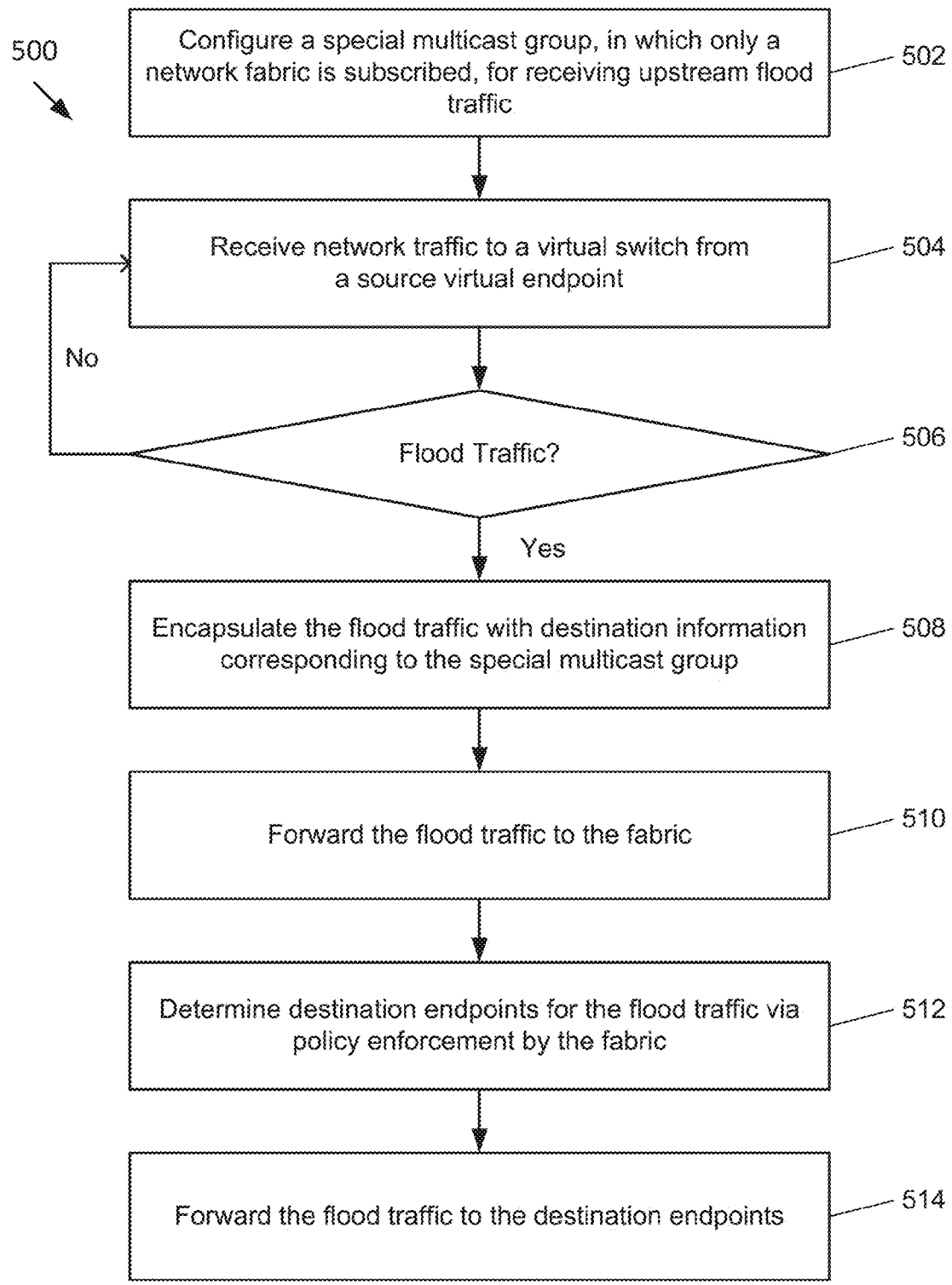
FIG. 5 illustrates an example method for enforcing policy for upstream flood traffic via a physical network layer according to some aspects of the subject technology.

Having disclosed some basic system components and concepts, the disclosure now turns to an example process that can be used in an embodiment as shown in FIG. 5. For the sake of clarity, the method is described in terms of a network fabric 312, as shown in FIG. 3, configured to practice the method. The steps outlined herein are exemplary and can be implemented in any combination thereof, including combinations that exclude, add, or modify certain steps.

Method 500 begins at step 502 in which a special multicast group is configured such that only elements of a physical network of a data center (e.g., physical switches, routers) are joined or subscribed. Alternatively or additionally, the network is configured such that endpoints in the network are prohibited from joining the special multicast group. The method can continue at step 504 by receiving network traffic from a source virtual endpoint to a virtual switch. The virtual endpoint and virtual switch are "downstream" from the network fabric, and network traffic originating from the virtual endpoint is propagated "upstream" towards the virtual switch and the network fabric. A determination is made 506 whether the network traffic corresponds to flood traffic, such as one or more broadcast, unknown unicast, or multicast frames. If the network traffic comprises flood traffic, the flood packets are encapsulated with destination information corresponding to the special multicast group 508, such as an IP address in the multicast group address space that is reserved for the special multicast group. As discussed, this ensures that the flood traffic will be routed to the fabric before being routed to a designated multicast group address (and unintended endpoints). Further, this enables the fabric to enforce policy, and limits transmission of the flood traffic to intended endpoints. Subsequently, the flood packets are forwarded to a next hop and ultimately received by the network fabric 510. In some embodiments, the virtual switch may be a virtual tunnel endpoint (VTEP) that performs the encapsulation and forwarding. In some embodiments, when the encapsulated flood traffic is received by the fabric at an ingress leaf node, the encapsulated flood traffic may be de-encapsulated and re-encapsulated using a specific network virtualization encapsulation format, such as VXLAN. In certain embodiments, if the encapsulated flood traffic is already in VXLAN format, there is no de-encapsulation and re-encapsulation.

In one example, the flood traffic can be received at a leaf switch, such as leaf switch $304_N$ of FIG. 3, connected to a physical network layer, such as network fabric 312. The leaf switch $304_N$ can be responsible for performing routing and policy enforcement functions. The leaf switch $304_N$ can include a memory device where it stores a policy table. In one example, the flood traffic can be received at a leaf switch $304_N$ that serves as the ingress switch for the flood traffic to network fabric 312.

Upon the flood traffic being received by the leaf switch, the method continues to step 512 where the network fabric can determine one or more destination endpoint groups (dEPGs) by applying one or more applicable policies to the flood traffic. As discussed, an endpoint group (EPG) is a collection of similar endpoints that require similar policy. A policy defines the allowed communication between endpoints according to the EPGs to which they belong. A collection of endpoints can be associated with an endpoint group based on a number of different characteristics. For example, an endpoint group can be based on a subnet, an internet protocol (IP) address, a virtual local area network (VLAN), a virtual extensible local area network (VXLAN), a media access control (MAC) address, a domain name server (DNS) name or range, network services, security services, network storage, etc. or any combination thereof. Those that are skilled in the art will recognize that endpoint groups are very flexible and can be defined based on any number of different factors. Endpoint groups can be used to efficiently define policy within a network. By defining policies according to EPGs rather than individual endpoints, the scalability of the policy table can be greatly increased.

In one example, a leaf switch can determine a source EPG (sEPG) and one or more dEPGs by analyzing the flood traffic to identify the originating endpoint and the destination endpoint(s) and their respective EPGs. As will be appreciated by one of ordinary skill in the art, a destination EPG can also include a multicast group corresponding to the virtual network of the sEPG. A network device serving as the ingress leaf switch can identify the sEPG for all endpoints that are attached to it. Furthermore, in some instances the ingress leaf switch may also be able to identify the dEPG(s) based on the characteristics of previous network traffic saved or cached at the particular ingress switch. Alternatively, if the ingress switch is not able to identify the dEPG(s), it can tag the flood traffic data with the appropriate sEPG and forward it to a spine switch $302_N$ for further routing. The flood traffic will then be routed through the fabric and arrive at one or more appropriate egress leaf switches that are associated with the destination endpoint(s). The egress leaf switch can extract the sEPG information from the data packet because it was previously added by the ingress leaf switch. The egress leaf switches can also identify the dEPGs because the destination endpoints are attached to the egress leaf switches.

Once the sEPG and dEPG(s) are identified, the network device can perform a policy lookup. As discussed, policies define the nature of communications between EPGs. An example of a policy may be to allow traffic between two endpoint groups. Another example of a policy may be to make a copy of data packets between two endpoint groups. As one that is skilled in the art will recognize, a policy is a flexible tool that can be used to define numerous functions within a network. Other examples of policies include redirect, deny, change quality of service (QoS), encrypt, or drop actions.

A network device can perform a policy lookup by accessing the policy table stored on its local memory device. In one embodiment, a policy table can be stored using a ternary content-addressable memory (TCAM). By using a TCAM, the network device can determine if a policy is present in a single lookup operation. Alternatively, the network device may use other forms of memory such as RAM, Flash, EEPROM, etc. to store the policy table.

Figure 6:
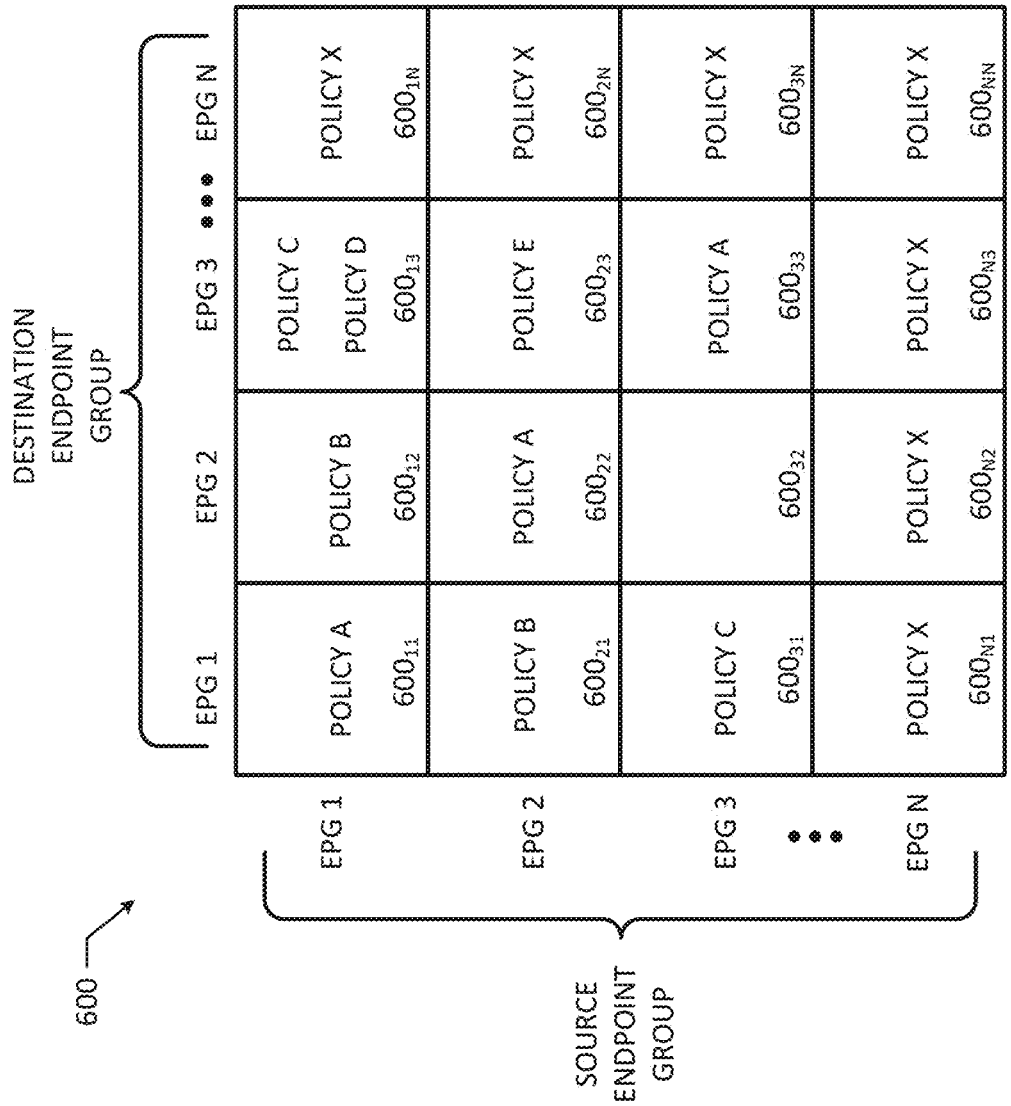
FIG. 6 illustrates an example of a matrix of policies among endpoint groups according to some aspects of the subject technology.

In the unicast case, the policy lookup is based on the sEPG and dEPG. FIG. 6 illustrates an example of a matrix 600 of policies among endpoint groups. The matrix form in FIG. 6 is used for ease of readability and to facilitate the understanding of how a policy table works. However, a policy table need not be stored in a matrix format or any particular type of data structure. In matrix 600, each box lists the applicable policy or policies between a particular source endpoint group and a destination endpoint group. In one example, the network device can perform a lookup for sEPG=EPG 1 and destination EPG=EPG 1 to determine the appropriate policy for a packet that is traveling from an endpoint that is part of EPG 1 to an endpoint that is also part of EPG 1. Accordingly, box $600_{11}$ dictates that "Policy A" should be applied to traffic that travels from an endpoint that is part of EPG 1 to and an endpoint that is also part of EPG 1. Policy A may correspond to a policy that allows traffic to travel between the endpoints.

The nature of multicast (and broadcast and unknown unicast) makes policy enforcement slightly different for such cases. Although the sEPG can easily be determined at ingress because it is never a multicast address, the destination is an abstract entity—the multicast group may comprise endpoints from multiple EPGs. In these situations, a multicast EPG can be used for policy enforcement. These groups are defined by specifying a multicast address range or ranges. Policy is then configured between the sEPG and the multicast group.

The multicast group (EPG group corresponding to the multicast stream) is always the destination and never used as the sEPG. Traffic sent to a multicast group is either from the multicast source or a receiver joining the stream through an Internet Group Management Protocol (IGMP) join. Because multicast streams are non-hierarchical and the stream itself is already in the forwarding table (using IGMP join), multicast policy is always enforced at ingress. This prevents the need for multicast policy to be written to egress leaves.

In some embodiments, the same policies are applied in a bidirectional fashion. For example, box $600_{12}$ provides for "Policy B" to be applied to traffic from EPG 1 to EPG 2, and box $600_{21}$ provides for "Policy B" to also be applied to traffic from EPG 2 to EPG 1. Alternatively, policies can be applied differently for data that is going in one direction versus another. For example, box $600_{13}$ provides for both "Policy C" and "Policy D" to be applied to traffic from EPG 1 to EPG 3 while box $600_{31}$ provides only for "Policy C" to be applied to the data that travels in the opposite direction, from EPG 3 to EPG 1. Here, "Policy C" may be used to allow traffic to flow in both directions. However, "Policy D" may be used to change the quality of service (QoS) of the traffic in only one of the directions.

In some embodiments, a network can control data traffic by using a whitelist model wherein a policy must be present to allow communication. For example, box $600_{32}$ defines the policies that govern traffic from EPG 3 to EPG 2. However, because this box does not contain any policies, traffic would not be allowed to flow from EPG 3 to EPG 2 under a whitelist model. Conversely, box $600_{23}$ includes "Policy E" that governs traffic from EPG 2 to EPG 3. Hence, under a whitelist model, this example would allow unidirectional traffic from EPG 2 to EPG3. Alternatively, a network can employ a blacklist model in which all traffic is permitted unless a particular policy exists to prevent it.

In addition to the sEPG and dEPG(s), a policy can be defined according to other characteristics. In some embodiments, a policy can be further defined in accordance with the protocol that is associated with the data packet. For example, a policy can dictate that hypertext transfer protocol (HTTP) traffic between EPG 1 and EPG 2 is allowed and that file transfer protocol (FTP) traffic should be redirected. Accordingly, the network device can analyze the data packet to determine that the transport layer (Layer 4) port number is 80, which is associated with HTTP, and permit the traffic. Similarly, the network device can redirect a data packet having a transport layer port number of 20 or 21, which is associated with FTP. Those that are skilled in the art will recognize that the applicable standards define many port numbers and the associated services. Thus, the network device can perform a policy lookup using criteria that includes the sEPG, the dEPG, and the port numbers associated with a transport layer service.

Turning back to FIG. 5, the network device performs the policy lookup to determine if a policy is available. As discussed, this determination can be made in a single lookup operation with the use of a TCAM. In some instances, a policy may not be available because the policy table on the memory of the network device is full and does not have room to store additional policies. Alternatively, a policy may not be available because the network device does not have the resources or capability to enforce the policy. For example, a network operator may wish to implement a new policy that requires all traffic between two EPGs to be encrypted. However, the network device may not have the hardware or software resources to perform the encryption, thus making it impractical to store the encryption policy on the network device's policy table.

If an appropriate policy is identified, the policy is enforced. Enforcement of the policy may involve a number of actions such as allowing the traffic to continue, redirecting the traffic, changing the quality of service, or copying the data packet. In addition, the network device may also apply a tag to the data packet or set one or more bits in the data packet to mark the enforcement of the policy. In the case where the policy is enforced at an ingress switch, the bits or tag can be read by the egress switch and allow the packet to be forwarded without duplicating the policy enforcement process. Once the policy is applied, the flood traffic can be forwarded to its appropriate endpoint(s) at 514.

Alternatively, if the network device determines that a policy is not available, the flood traffic data is forwarded to a policy enforcement proxy. The policy enforcement proxy can provide a failsafe mechanism for data packets that would otherwise be dropped in a network employing a whitelist model. The policy enforcement proxy can store network policies that could not be stored on the network device's local memory either because the memory was full or because the network device does not have the capability to enforce the policy. In some embodiments, the policy enforcement proxy can be a server that has significantly more processing and memory resources than a leaf switch. Alternatively, the policy enforcement proxy can be a separate switch that has excess computing/memory resources that can be allocated for performing the policy enforcement. Although the policy enforcement proxy can be part of the data center, it need not be physically collocated with the network, so long as it is communicatively coupled to the network device.

In some embodiments, the network device can modify the data packet prior to forwarding it to the policy enforcement proxy. As discussed above, the applicable policy is dictated by the sEPG and dEPG(s), as well as the transport protocol. When the policy lookup is performed at an egress switch, the egress switch determines the sEPG from the tag that was applied by the ingress switch and it determines the dEPG(s) according to the locally stored information that relates to all of its attached endpoints. If the policy is not available at the egress switch, it can modify the data packet to also include a tag that identifies the dEPG(s) so that the policy enforcement proxy can discern all necessary information directly from the contents of the packet.

Figure 7:
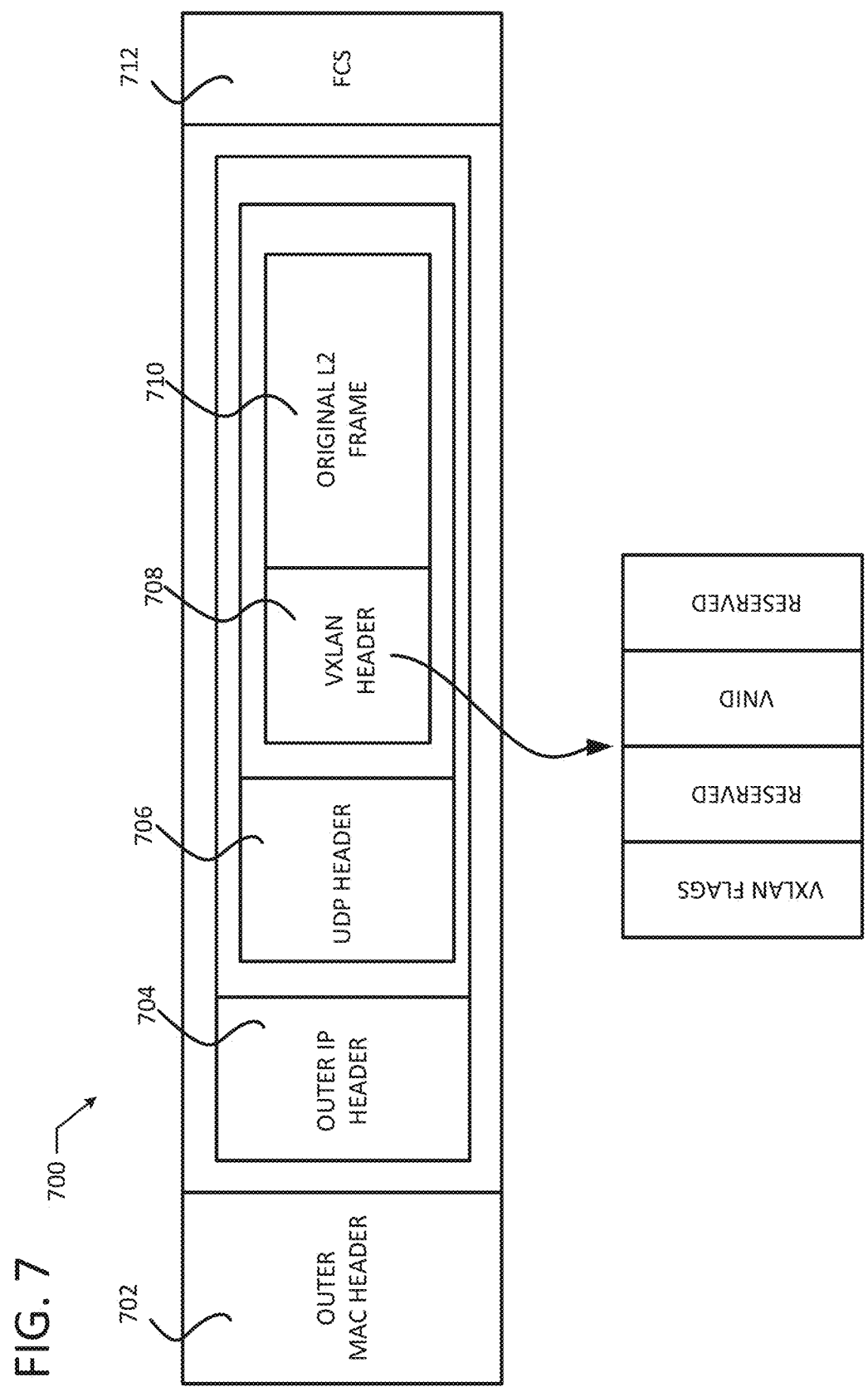
FIG. 7 illustrates an example of a virtual extensible local area network (VXLAN) data packet according to some aspects of the subject technology.

In some embodiments, the data packets are encapsulated using a virtual extensible local area network (VXLAN) packet format. FIG. 7 illustrates an example of a VXLAN data packet 700. VXLAN defines a MAC-in-UDP (media access control in user datagram protocol) encapsulation scheme where the original Layer 2 frame 710 has a VXLAN header 708 added and is then placed in a UDP-IP packet. The VXLAN header 708 is an 8 byte field which has 1 byte allocated for VXLAN flags, 3 bytes allocated to the VNID field, and 4 bytes allocated to two separate reserved fields (3 bytes and 1 byte, respectively). The VXLAN header 708 together with the original Ethernet (L2) frame is stored in the UDP payload. To avoid growing the size of the data packet, the network device can utilize the reserved fields in the VXLAN header 708 to include the tags for the sEPG, dEPG.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

For clarity of explanation, in some instances the present technology may be presented as including individual functional blocks including functional blocks comprising devices, device components, steps or routines in a method embodied in software, or combinations of hardware and software.

Note that in certain example implementations, the optimization and/or placement functions outlined herein may be implemented by logic encoded in one or more tangible, non-transitory media (e.g., embedded logic provided in an application specific integrated circuit (ASIC), digital signal processor (DSP) instructions, software (potentially inclusive of object code and source code) to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   obtaining network traffic from a source virtual endpoint to be forwarded to one or more destination endpoints, at least one of the one or more destination endpoints residing in a logical network associated with a network environment comprising a physical network and one or more logical networks;
   determining the network traffic comprises encapsulated flood traffic, the encapsulated flood traffic comprising flood traffic and destination address information defining a multicast destination address for the encapsulated flood traffic, the multicast destination address being mapped to one or more elements in the physical network and excluding endpoints residing in the one or more logical networks, the multicast destination address steering the flood traffic through the one or more elements in the physical network prior to reaching the at least one of the one or more destination endpoints residing in the logical network;

mapping the source virtual endpoint to a first endpoint group and the one or more destination endpoints to a respective second endpoint group;

determining one or more policies between the first endpoint group and the respective second endpoint group;

applying the one or more policies via at least one of the one or more elements in the physical network associated with the multicast destination address;

determining the or more destination endpoints for the flood traffic; and forwarding the flood traffic in the encapsulated flood traffic toward the one or more destination endpoints based at least in part on one or more destination addresses associated with the flood traffic.

2. The method of claim 1, wherein the physical network comprises a data center fabric and the multicast destination address is associated with a multicast group, the multicast group comprising nodes subscribed to the multicast group, the nodes subscribed to the multicast group comprise only nodes in the data center fabric.

3. The method of claim 1, wherein the one or more policies correspond to an allow, deny, redirect, change quality of service (QoS), encrypt, drop, or copy action.

4. The method of claim 1, wherein the network traffic is received from a virtual switch associated with the source virtual endpoint, and wherein the source virtual endpoint and the virtual switch are downstream from the physical network.

5. The method of claim 4, wherein the virtual switch is a virtual tunnel endpoint.

6. The method of claim 1, wherein the flood traffic comprises one or more broadcast, unknown unicast, or multicast frames.

7. The method of claim 1, wherein the physical network comprises a data center having one or more spine and leaf switches.

8. A system comprising:
at least one processor; and
at least one non-transitory computer-readable storage medium having stored therein instructions that, upon being executed by the at least one processor, cause the at least one processor to:
receive traffic originating from a source virtual endpoint, the traffic being designated for one or more destination endpoints, at least one of the one or more destination endpoints residing in a logical network associated with a network environment comprising a physical network and one or more logical networks;
determine the traffic comprises encapsulated flood traffic, the encapsulated flood traffic comprising flood traffic and destination address information defining a multicast destination address for the encapsulated flood traffic, the multicast destination address being mapped to one or more elements in the physical network and excluding endpoints residing in the one or more logical networks, the multicast destination address steering the flood traffic through the one or more elements in the physical network prior to reaching the at least one of the one or more destination endpoints residing in the logical network;
map the source virtual endpoint to a first endpoint group and the one or more destination endpoints to a respective second endpoint group;
determine one or more policies between the first endpoint group and the respective second endpoint group;
enforce the one or more policies via at least one of the one or more elements of the physical network;
determine the one or more destination endpoints associated with the flood traffic; and
forward the flood traffic in the encapsulated flood traffic toward the one or more destination endpoints based at least in part on one or more destination addresses associated with the flood traffic.

9. The system of claim 8, wherein the instructions upon being executed further cause the at least one processor to:
perform a lookup for the one or more policies based on the first endpoint group and the respective second endpoint group.

10. The system of claim 8, wherein the multicast destination address corresponds to a multicast group, wherein the instructions upon being executed further cause the at least one processor to:
configure the multicast group such that no endpoints in the one or more logical networks can subscribe to the multicast group.

11. The system of claim 8, wherein the traffic is received from at least one of a virtual switch or a virtual tunnel endpoint.

12. The system of claim 8, wherein the physical network comprises a Clos or spine-leaf network.

13. The system of claim 8, wherein the source virtual endpoint is downstream from the physical network, the physical network comprising a network fabric.

14. The system of claim 8, further comprising:
a virtual switch associated with a same logical or virtual network as the source virtual endpoint, the virtual switch being configured to:
receive the flood traffic from the source virtual endpoint;
encapsulate the flood traffic with the destination address information to yield the encapsulated flood traffic; and
forward the encapsulated flood traffic towards the physical network based on the destination address information.

15. The system of claim 14, wherein the same logical or virtual network comprises an overlay network, and wherein the physical network comprises a network fabric.

16. A non-transitory computer-readable storage medium having stored therein instructions that, upon being executed by a at least one processor, cause the at least one processor to:
obtain network traffic associated with a source virtual endpoint, the network traffic to be forwarded to one or more destination endpoints, at least one of the one or more destination endpoints residing in a logical network associated with a physical network;
determine the network traffic comprises encapsulated flood traffic including flood traffic and destination information corresponding to a multicast group for the encapsulated flood traffic, the multicast group comprising one or more elements of the physical network and excluding endpoints residing in the logical network, the destination information comprising a network address for steering the flood traffic through the one or more elements in the physical network prior to reaching the at least one of the one or more destination endpoints residing in the logical network;

map the source virtual endpoint to a first endpoint group and the one or more destination endpoints to a respective second endpoint group;

determine one or more policies between the first endpoint group and the respective second endpoint group;

apply the one or more policies via at least one of the one or more elements in the physical network;

determine the or more destination endpoints associated with the flood traffic; and forward the flood traffic in the encapsulated flood traffic toward one or more destination endpoints based at least in part on one or more destination addresses associated with the flood traffic.

17. The non-transitory computer-readable storage medium of claim 16, wherein the instructions upon being executed further cause the at least one processor to:

encapsulate the flood traffic with the network address to yield the encapsulated flood traffic; and forward the encapsulated flood traffic based on the network address in the encapsulated flood traffic.

18. The non-transitory computer-readable storage medium of claim 16, wherein the one or more policies are based on a whitelist model.

19. The non-transitory computer-readable storage medium of claim 16, wherein the physical network comprises one or more spine switches and leaf switches, wherein the one or more leaf switches and spine switches are interconnected.

20. The non-transitory computer-readable storage medium of claim 16, wherein the one or more policies correspond to an allow, deny, redirect, change quality of service (QoS), encrypt, drop, or copy action.

* * * * *